Sept. 16, 1969  J. B. JONES  3,466,970
TRANSDUCER COUPLING SYSTEM
Filed July 6, 1965  2 Sheets-Sheet 1
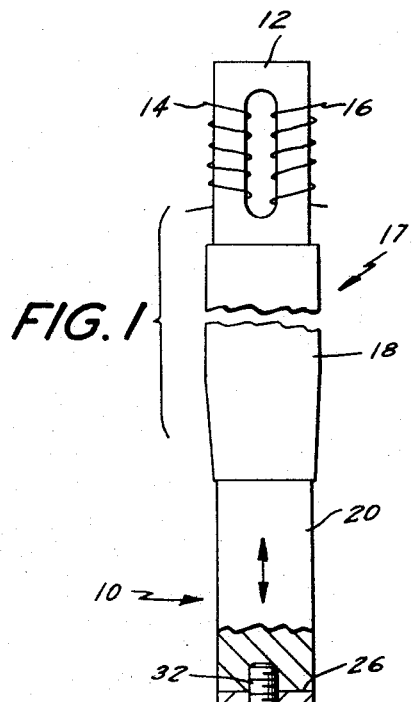
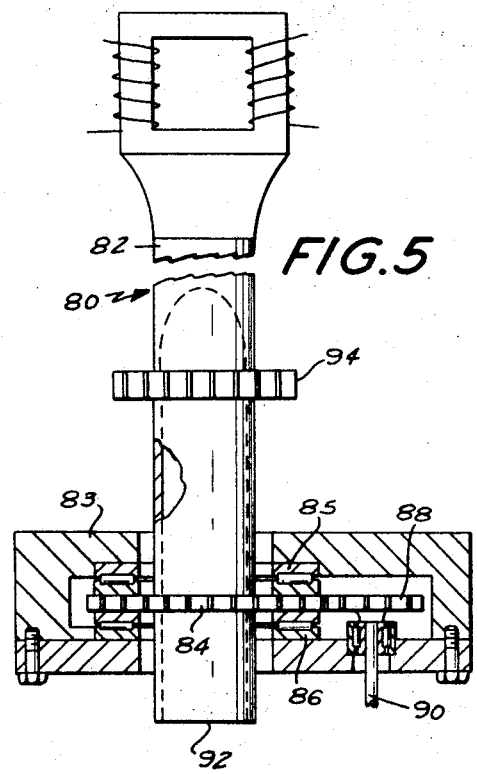
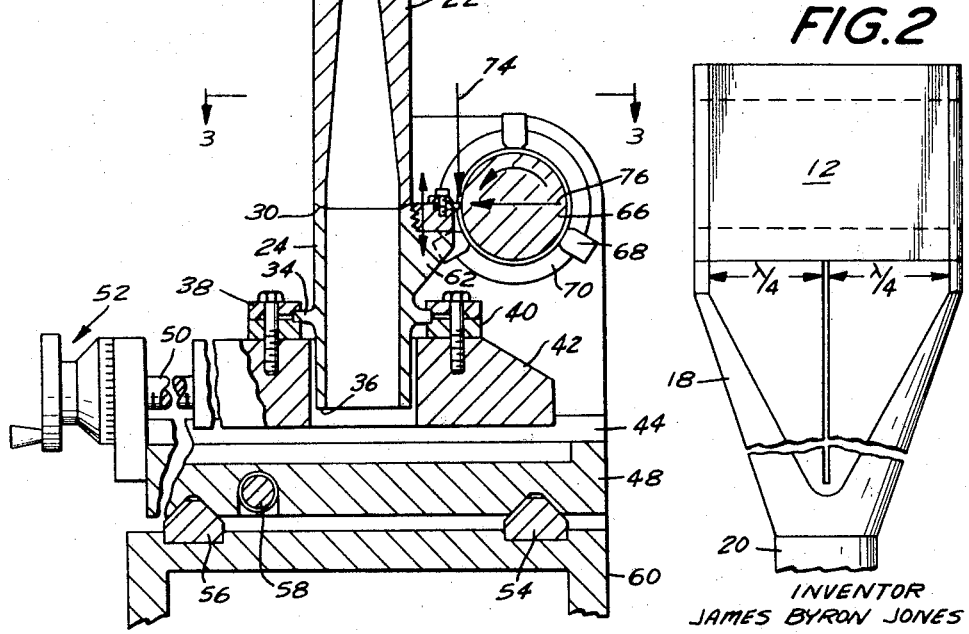
INVENTOR
JAMES BYRON JONES
BY
Seidel & Gonda
ATTORNEYS.

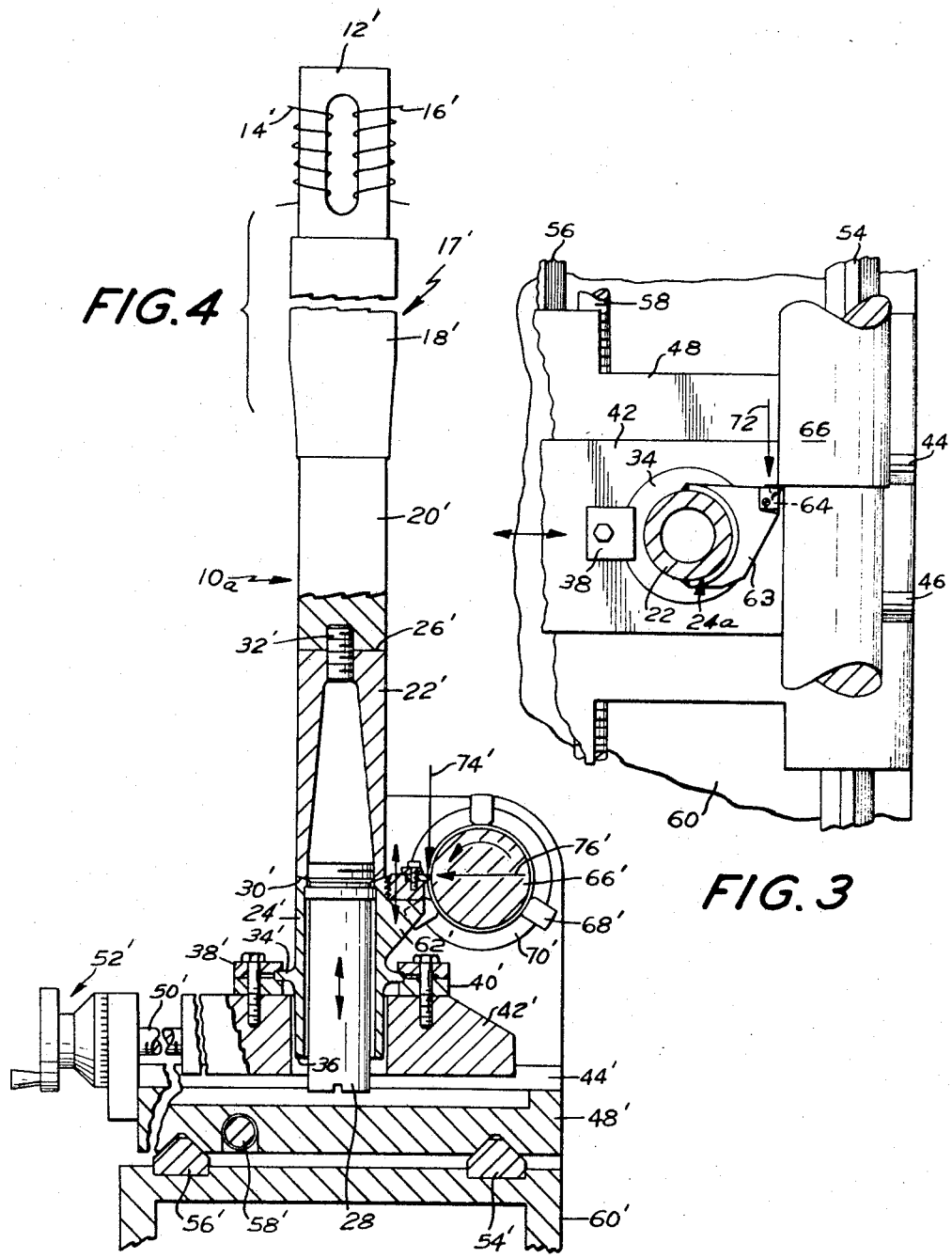

United States Patent Office 3,466,970
Patented Sept. 16, 1969

3,466,970
TRANSDUCER COUPLING SYSTEM
James Byron Jones, West Chester, Pa., assignor to Aeroprojects Incorporated, West Chester, Pa., a corporation of Pennsylvania
Continuation-in-part of application Ser. No. 178,800, Mar. 12, 1962. This application July 6, 1965, Ser. No. 469,572
Int. Cl. B23c 7/00; B23b 47/02
U.S. Cl. 90—11     16 Claims

ABSTRACT OF THE DISCLOSURE

A transducer coupling system is disclosed having one end connected to a vibratory energy generating means. A work performing tip is secured to the system and spaced from the other end of the system by an even whole number of one-quarter wavelengths. The entire system and vibratory energy generating means are supported at a location between the work performing tip and said other end of the system at a node spaced from the other end of the system by an integral odd number of one-quarter wavelengths.

This invention relates to a transducer-coupling system for applying vibratory energy to a medium.

This application is a continuation-in-part of my copending application Ser. No. 178,800, filed on Mar. 12, 1962, entitled "Transducer Coupling System," and now Patent No. 3,209,447.

In the above identified patent application, there is disclosed apparatus and method providing for acceptance (without appreciable damping, frequency shift, etc.), by an appropriately mounted transducer-coupling system, of forces such as the single force component associated with applying a static force to the system and thence to the work. Such embodiments also involve pivoted support of the transducer-coupling system in the vicinity of the end which is remote from the location where the static force is applied.

It has been discovered that, instead of a pivoted support remote from the locale of the applied forces and the work-performing zone, a rigid cantilever-type supporting arrangement can be provided for the system in a location relatively near to the work-performing zone. Such an arrangement is of particular utility in applications involving multiple-component forces, so that the system will not only accept and operate efficiently under such complex conditions but offers unique potential for the effective utilization of ultrasonic energy. For the purposes of this application, ultrasonic energy is intended to mean high frequency and/or intensity vibration.

The present invention has particular utility, for example, as will be described in detail below, for very effective operation of a vibratory cutting tool, such as may be used on an ordinary lathe, a turret lathe, a shaper, etc. The invention makes it far more practical and convenient to install and remove cutting tool tips, which is an important factor in ultrasonic systems.

It has been ascertained that effective operation of an ultrasonically activated cutting tool in conjunction with a lathe will provide various advantages, such as increased tool life, decreased requisite tool forces, chatter elimination, a greater depth of cut, increased cutting speed, and/or improved surface finish. However, a stable system is necessary for reproducible production use, and tool tip interchangeability is desirable for diversified applications and for replacement of work tips. Thus, it is not sufficient merely to "apply vibratory energy," since various problems must be solved before effective production operation can be achieved.

It is an object of the present invention to provide a novel transducer-coupling system for use where non-vibratory forces are to be exerted on an acoustical coupler.

It is another object of the present invention to provide a novel transducer-coupling system for use where multiple-component forces are to be exerted on a coupler.

It is a further object of the present invention to provide a novel apparatus and method for vibratory material removal, as in lathe cutting of metals.

It is yet another object of the present invention to provide a novel "vibratory energy tool post" which can permit the effective utilization of vibratory energy on lathes, shapers, boring mills, spinning machinery, and other types of materials working devices.

It is yet a further object of the present invention to provide a novel cantilever-mounted ultrasonic system which is essentially a frequency-stable ultrasonic device under circumstances of practical working conditions, and which permits the delivery of uniaxial motion offering high vibratory forces around a peripheral locale on the ultrasonic system.

Other objects will appear hereinafter.

For the purpose of illustrating the invention, there is shown in the drawings a form which is presently preferred; it being understood, however, that this invention is not limited to the precise arrangements and instrumentalities shown.

FIGURE 1 is an elevation view, partly in section, of one embodiment of the present invention.

FIGURE 2 is an elevation view of the transducer and portion of the transducer-coupling system.

FIGURE 3 is a sectional view taken along the line 2—2 in FIGURE 1.

FIGURE 4 is an elevation view, partly in section, of the embodiment of FIGURE 1, modified to include a stabilizing stub.

FIGURE 5 is an elevation view, partly in section, of another embodiment of the present invention.

Referring to the drawings in detail, wherein like numerals indicate like elements, there is shown in FIGURE 1 an ultrasonically activated cutting tool associated with a machine tool such as a lathe designated generally as 10.

The cutting tool 10 includes a magnetostrictive transducer array 12 having an excitation coil 14 and a polarizing coil 18. The transducer array 12 is of conventional construction comprising a one-half-wavelength laminated core of nickel, nickel-iron alloy, Permendur (an iron-cobalt alloy), Alfenol (an aluminum-iron alloy) or other magnetostrictive material, properly dimensioned to insure axial resonance with the frequency of the alternating current applied thereto by excitation coil 14 so as to cause it to increase or decrease in length according to its coefficient of magnetostriction.

A detailed construction of a suitable magnetostrictive transducer array, which in the illustrated embodiment comprises nickel laminations, is well known to those skilled in the art and per se forms no part of the present invention. Accordingly, no detailed description of its constrution will be made herein. It will be appreciated by those skilled in the art that in place of the transducer array 12, other known types of transducers may be substituted. Thus, electrostrictive or piezoelectric transducers, made of barium titanate, quartz crystals, etc., may be utilized; see, for example U.S. Patent application Ser. No. 456,900, now Patent No. 3,283,182.

Coil 14 is connected to a power supply (not shown) incorporating an oscillator and amplifier suitable for powering the transducer array 12. Such equipment is well known to the art. The transducer array 12 is also provided with a polarizing coil 16, the desirability of magnetically polarizing the transducer 12 by means of coil 16, in order for the metal laminations of transducer 12 to efficiently convert the applied energy from coil 14 into elastic vibratory energy, will be readily understood by those skilled in the art.

The magnetostrictive transducer array 12 is metallurgically bonded in end-to-end contact, as by silver brazing or the like, to one end of an acoustic coupler generally designated as 17. The coupler 17 may be any one of a wide variety of couplers known to the art, and is preferably made from one or more suitable materials such as aluminum bronze, Monel, or titanium alloy. The coupler 17 is of resonant length and may be a whole number multiple of one-half wavelength long at the design frequency of vibration for the apparatus.

Coupler 17 comprises portions 18, 20, 22 and 24. Portions 18 and 22 are sculptured (18 externally, 22 internally) in the embodiment of FIGURE 1 for purposes including increasing amplitude of vibration. Such sculpturing (and the resonant frequency dimensioning involved) is well known in the art. The other end of portion 18 of coupler 17 is metallurgically joined to one end of portion 20. Portions 20 and 22 are of the same diameter and joined together at interface 26 by the threaded member 32. The lowermost end of the portion 22 is metallurgically joined to the upper end 30 of portion 24. Portion 24 is essentially a hollow extension of portion 22, but is manufactured as a separate part for convenience in sculpturing it for suitable association with the tool cutting array to be described hereinbelow. Portion 24 is hollow so as to retain the advantage of the increased amplitude of vibration associated with the internal tapering of portion 22.

While acoustical coupler 17 has been described hereinabove as embodying various means for increasing vibration amplitude, it will be appreciated by those skilled in the art that coupler 17 may assume other forms. Thus, it may be a single solid bar of resonant length.

As illustrated, portion 24 is one-half wavelength long. At a location which is one-quarter wavelength from the free end of portion 24, there is provided a radially outwardly extending flange 34. The flange 34 is supported between clamps 38 and 40 on a lathe cross-feed table 42. Table 42 is mounted on ways 44 and 46. The ways 44 and 46 are supported by a carriage 48.

The table 42 and the above-described elements supported thereby are reciprocated in the direction of the double-headed arrow in FIGURE 3 by means of a lead screw 50 and a handwheel 52. The carriage 48 is supported on ways 54 and 56. The last-mentioned ways are supported by a bed or frame 60. Reciprocation of the carriage 48 corresponding to the direction of the longitudinal axes of the ways 54 and 56 is effected by means of a lead screw 58.

Portion 24 of acoustical coupling member 17 is provided with a shelf-like projection 62 which supports a tool holder 63. The tool holder 63 is metallurgically bonded (as by brazing) where it abuts the shelf of projection 62 and where its semicircular portion abuts the column of portion 24 at 24a. As shown more clearly in FIGURE 1, there is a meshing engagement of teeth between the semicircular saddle-like tool holder 63 and the portion 24 to prevent excessive stress on the brazed junction. A cutting tip 64 is mechanically and removably supported by the tool holder 63 by means of a clamping plate and clamp screw. The tool holder 63 is an irregularly-shaped plate-like member having a semicircular portion abutting the cylindrical portion of portion 24. As previously noted, holder 63 carries at its extremity opposite its semicircular portion a standard mechanically attachable cutting tip 64. Tool holder 63 is essentially a part of portion 24, acoustically speaking, and therefore its dimensions (non-linear as it is) should not be so great as to constitute too great a mass load on portion 24 of coupling member 17 or on the system of which it is a part. Such dimensioning is within the skill of the art.

Tool tip 64 may be a standard insert machining tip made from any appropriate material such as carbide materials. The material to be cut by tip 64 is designated as 66. Material 66 may be supported by jaws 68 on a chuck 70.

In conventional lathe-turning, there are three primary force factors acting on the cutting tool: tangential, radial, and side. The tangential force factor is illustrated in FIGURE 1 by arrow 74. The radial force factor is indicated in FIGURE 1 by the arrow 76. The side force factor is indicated in FIGURE 3 by the arrow 72. It can be seen that: (1) the force directed along the direction of arrow 72 tends to twist the coupling system about the axis of coupler 17, (2) the force directed along arrow 74 tends to bend the axis of the coupling system in the direction of the turning centers of the lathe generally about the flange 34, and (3) the force directed along arrow 76 tends to change the magnitude of reaction required to resist the forces in the direction of arrows 72 and 74. Moreover, depending upon the cutting velocity and the position of the tool and the material being cut, etc., the interrelation between these force factors changes.

Thus, complete support of the transducer-coupling system at the flange 34 constitutes a cantilever-like support capable of accepting a variety of force conditions at the location of the cutting tip 64. Gross vibrational excursion of the cutting tool holder 63 and projection 62 is in the direction of the double-headed arrow superimposed thereon in FIGURE 1.

The force introduced into the cutting tip to oppose the force directed along arrow 72 is effected by the lead screw 58 driving the longitudinal carriage 48 and thence, via the ways 44–46 through the table 42, the clamping rings and screws 38–40, the flange 34, and the portion 24. The projection 62 is tapered toward the flange 34 to provide sufficient rigidity to oppose forces directed along arrow 74. It will be noted that the entire cutting tool may be removed for maintenance, adjustment or modification by merely loosening the bolts associated with clamps 38 and 40.

The embodiment 10a of FIGURE 4 is like the embodiment 10 of FIGURE 1, except for the addition of a portion 28 to acoustical coupling member 17. Portion 28 is here illustrated as being one-half wavelength long and is threadedly engaged to the lower end of portion 22. Portion 28 may have a radially outwardly directed shoulder which mates with a shoulder on portion 24 adjacent the upper end 30.

In view of the elastic performance of materials, it will be seen from FIGURE 1 that the over-all cross section of the coupler system at the location of the cutting tip 64 tends to vary around the periphery, due to the energy removal at cutter tip 64. Portion 28 provides the effect of a heavy mass without mass-loading the system, thereby both stabilizing the excursions of portion 24 in the area of the support for the cutter tip 64 and precluding unusual and extraneous modes of vibration such as would detract from system efficiency and effectiveness.

The apparatus 10 will function without portion 28 but its inclusion as part of apparatus 10a is desirable in view of the fact that the vibratory energy from the transducer is removed from the acoustical coupling system at a single point on its periphery, namely, by way of the cutter tip.

With a system having nominal resonant frequency of 15 kc., tests were run on an ultra high strength steel alloy (a product of Vanadium-Alloys Steel Company, Latrobe, Pa.) using an electrical power input to the transducer of 750 watts, a cutting depth of 0.100 inch, and a feed rate of 0.0056 inch per revolution (i.p.r.). The percentage reduction in tool force increased with speed in the range of 150 surface feet per minute (s.f.m.) to 400 s.f.m. At the same power level and cutting depth, it appeared that the ultrasonic effect was inversely proportional to the feed rate, i.e., the maximum effect was noted at the lowest feed rate of 0.0056 i.p.r.

The present invention can also be utilized in connection with rotating metal working machinery, such as a milling machine. As illustrated in FIGURE 5 the essential components of a milling machine 80. Milling machine 80 includes a transducer-coupling system as described above and illustrated in FIGURE 1 except as will be desribed hereinafter. Milling machine 80 includes a resonant coupler 82 having a flange 84 corresponding to flange 34. However, flange 84 is supported in a bed 83 by bearing 85 and 86. Gear teeth on the periphery of flange 84 are in meshing engagement with gear 88 on drive shaft 90. Flange 84 is spaced from the free end 92 of coupler 82 which is an antinode by an accoustical distance of an odd whole number multiple of one-quarter wavelengths of sound in coupler 82 at the design frequency. Coupler 82 may be a single integral member or may be comprised of portions such as portions 18–24.

The coupler 82 may be internally sculptured as indicated in phantom. A cutting tip such as a milling cutter 94 is rigidly supported by and circumferentially disposed around coupler 82. Cutter 94 may be metallurgically bonded to coupler 82 as by brazing. The cutter 94 is spaced from the end 92 by an acoustical distance of a whole number multiple of one-half wavelengths of sound in coupler 82 at the design frequency thereby locating cutter 94 at an antinode. In order for the cutter 94 to be able to cut metal, gear 88 rotatably drives the coupler 82 about its longitudinal axis of cutter 94.

Slip rings for introducing the high-frequency alternating current to coil 14 or the D-C polarizing current to coil 16 are not shown. Such slip rings with appropriate mounting methods are well known to the art and those illustrated in U.S. Patent 2,946,120, for example, may be used.

While the present invention has been illustrated and described in connection with a vibratory lathe machine tool and a vibratory milling machine, it will be appreciated that it may be used in other applications wherein rigid mounting is desirable or necessary—particularly those applications involving multi-component rather than single-component forces. Hereinafter, the cutting tips 64 or 94 may be referred to as a work performing member.

The present invention may be embodied in other specific forms without departing from the spirit or essential attributes thereof and, accordingly, reference should be made to the appended claims rather than to the foregoing specification as indicating the scope of the invention.

I claim:
1. Apparatus comprising a vibratory generating means, a vibratory energy coupler system having one end coupled to said means, said system having a length corresponding to an integral number of one-half wavelengths according to the properties and geometry of said system and its intended operating frequency, a cutting tool supported by said system at an antinode thereon spaced from the other end of the system by an integral even number of one-quarter wavelengths, and means for supporting the system at a node of vibratory energy in said system for moving the system and cutting tool as a unit, said node being located between said cutting tool and the other end of said system, said node being spaced an integral odd number of one-quarter wavelengths from the other end of the system.

2. Apparatus in accordance with claim 1 wherein said supporting means includes a mount having a radially outwardly directed flange spaced an integral odd number of one-quarter wavelengths from said other end thereof, and said system and cutting tool being supported by said flange on said mount.

3. Apparatus in accordance with claim 1 wherein said tool is a cutting tip removably supported by said system.

4. Apparatus in accordance with claim 1 including a lathe cross-feed table supporting said system and mounted for movement in two mutually perpendicular directions.

5. Apparatus in accordance with claim 1 including a tool holder fixedly secured to a projection on said system at said antinode, and mechanical means for removably supporting the cutting tool on said tool holder.

6. A cutting tool comprising a vibratory generating means, a resonant vibratory energy coupler system having one end coupled to said means, said system having a length corresponding to an integral number of one-half wavelengths according to the properties in geometry of said system at its intended operating frequency, a cutting tip removably supported by said system at an antinode thereof spaced from the other end of the system by an integral even number of one-quarter wavelengths, said system having a radially outwardly directed flange spaced from said other end by a distance corresponding to an integral odd number of one-quarter wavelengths according to the properties in geometry of said system at its intended operating frequency, and said system being supported at said flange with the flange being between said other end and the cutting tip.

7. A cutting tool in accordance with claim 6 wherein said vibratory generating means is constructed and arranged to couple ultrasonic vibratory energy to said system to vibrate said system in an axial mode, and a portion of said system being sculptured internally to facilitate increasing the amplitude of vibration emanating from said vibratory energy means.

8. A cutting tool in accordance with claim 7 wherein said system includes a force-insensitive mount on which said flange is located, a tool holder fixedly supported on one end of said mount, and mechanical means for removably supporting said cutting tip on said tool holder, said mount having an outwardly directed projection adjacent said one end of said mount, and said tool holder being supported by said projection.

9. In a lathe having a head stock means and a tail stock means aligned with one another at a horizontal axis, a cross-feed table mounted for movement parallel and perpendicular to said axis, a cutting tip supported by said table for movement therewith and effecting a cutting action on material supported along said axis, the improvement comprising a resonant coupler supported by said table at a flange on said coupler, said coupler having a length corresponding to an integral even number of one-quarter wavelengths according to the properties in geometry of said coupler at its intended operating frequency, said flange being spaced from one end of said coupler by an integral odd number of one-quarter wavelengths, said cutting tip removably supported at an antinode on said coupler, a vibratory energy generating means, said coupler having one end coupled to said generating means for transmitting vibratory energy to said tip, said generating means and coupler being supported by said flange, with the longitudinal axis of said coupler being generally perpendicular to said horizontal axis.

10. Apparatus comprising a vibration generating means, a resonant vibratory energy coupler having one end axially connected to said vibration generating means, a metal cutting tool on said coupler at an antinode spaced from the other end of said coupler by a distance corresponding to an integral number of one-half wavelengths according to the properties and geometry of said coupler, and means for supporting said coupler and tool at a node of vibratory energy in said coupler at a point between said tool and said other end of said coupler.

11. Apparatus in accordance with claim 10 including means coupled to said coupler adjacent said supporting means for rotating said coupler about its longitudinal axis.

12. Apparatus in accordance with claim 10 including a tool holder fixedly secured to said coupler, mechanical means removably supporting said cutting tool on said holder.

13. Apparatus in accordance with claim 10 including a mass connected to the coupler for stabilizing excursions of the coupler in the area of the supporting means.

14. Apparatus comprising a vibratory energy generating means, a resonant vibratory energy coupling system having one end coupled to said means, said system having a length corresponding to an integral number of one-half wavelengths according to the properties and geometry of said system at its intended operating frequency, a work performing member supported by said system at an antinode thereon spaced from the other end of the system by an integral even number of one-quarter wavelengths, said system having a node spaced from said other end by a distance corresponding to an integral odd number of one-quarter wavelengths according to the properties and geometry of said system at its intended operating frequency, and a flange for supporting said means and system at said node with the flange being between said other end and said member.

15. Apparatus in accordance with claim 14 wherein said system is hollow between said other end and the location of said member.

16. Apparatus in accordance with claim 14 wherein said vibratory generating means is constructed and arranged to couple ultrasonic vibratory energy to said system to vibrate said system in an axial mode, said system including a force-insensitive mount on which said flange is located, and said work-performing member being supported at one end of said mount.

References Cited

UNITED STATES PATENTS

| 1,292,494 | 1/1919 | Lorenz | 82—1 |
| 2,818,686 | 1/1958 | Weiss. | |
| 2,891,178 | 6/1959 | Elmore. | |
| 3,186,267 | 6/1965 | Pabst et al. | 82—2 |
| 3,190,156 | 6/1965 | Schuman | 82—2 |
| 2,268,983 | 1/1942 | Gilmore et al. | 82—1 |
| 3,135,148 | 6/1964 | Cole et al. | 82—1 |

LEONIDAS VLACHOS, Primary Examiner

U.S. Cl. X.R.

77—56, 82—1